United States Patent
Iwamoto et al.

(10) Patent No.: US 8,655,147 B2
(45) Date of Patent: Feb. 18, 2014

(54) CONTENT REPRODUCTION ORDER DETERMINATION SYSTEM, AND METHOD AND PROGRAM THEREOF

(75) Inventors: Kota Iwamoto, Tokyo (JP); Ryoma Oami, Tokyo (JP); Yuzo Senda, Tokyo (JP); Takahiro Kimoto, Tokyo (JP); Takami Sato, Tokyo (JP); Yasufumi Hirakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/001,399

(22) PCT Filed: Jun. 22, 2009

(86) PCT No.: PCT/JP2009/061307
§ 371 (c)(1),
(2), (4) Date: Mar. 9, 2011

(87) PCT Pub. No.: WO2009/157403
PCT Pub. Date: Dec. 30, 2009

(65) Prior Publication Data
US 2011/0150419 A1    Jun. 23, 2011

(30) Foreign Application Priority Data
Jun. 26, 2008 (JP) ................................ 2008-167343

(51) Int. Cl.
*H04N 9/80* (2006.01)
(52) U.S. Cl.
USPC ........................................ 386/241; 386/248
(58) Field of Classification Search
USPC ................................ 386/239–248
See application file for complete search history.

(56) References Cited

U.S. PATENT DOCUMENTS 5,835,667 A * 11/1998 Wactlar et al. ................ 386/241
6,363,380 B1 * 3/2002 Dimitrova ..................... 707/740
(Continued)

FOREIGN PATENT DOCUMENTS

EP    1843350 A1    10/2007
JP    2004-227423 A   8/2004
(Continued)

OTHER PUBLICATIONS

An Extended European Search Report dated Jun. 10, 2011 in counterpart European application No. 09770113.0.
(Continued)

*Primary Examiner* — Gelek W Topgyal
(74) *Attorney, Agent, or Firm* — Sughrue Mion, PLLC (57) ABSTRACT

A system comprising: a extraction unit that extracts from each content a signal feature series, being a series of signal features caused to correspond to positions on a time axis of the content; a generator for detects mutual similarity sections, being sections in which the signal features for different contents are similar to each other, from said signal feature series for each content, and generates the content to which each mutual similarity section belongs, information for specifying the position of the above mutual similarity section on the time axis of the content, and a link indicative of a correspondence relation of the mutual similarity section as mutual similarity section link information; and a determination unit that determines a reproduction order of the content based upon a relationship of the position of the mutual similarity section on the time axis of the content that said mutual similarity section link information indicates.

25 Claims, 5 Drawing Sheets

(56) References Cited

U.S. PATENT DOCUMENTS

| | | | |
|---|---|---|---|
| 6,754,438 B1* | 6/2004 | Matoba | 386/201 |
| 7,333,864 B1* | 2/2008 | Herley | 700/94 |
| 7,356,830 B1* | 4/2008 | Dimitrova | 725/51 |
| 7,523,474 B2* | 4/2009 | Herley | 725/19 |
| 2003/0023421 A1* | 1/2003 | Finn et al. | 704/1 |
| 2003/0175012 A1* | 9/2003 | Okada et al. | 386/69 |
| 2004/0001160 A1* | 1/2004 | Herley | 348/465 |
| 2004/0046801 A1* | 3/2004 | Lin et al. | 345/810 |
| 2005/0160111 A1* | 7/2005 | Plastina et al. | 707/102 |
| 2007/0083815 A1* | 4/2007 | Delorme et al. | 715/723 |
| 2007/0136741 A1* | 6/2007 | Stattenfield | 725/32 |
| 2008/0056673 A1* | 3/2008 | Morris | 386/95 |
| 2008/0309819 A1* | 12/2008 | Hardacker et al. | 348/553 |
| 2009/0022472 A1* | 1/2009 | Bronstein et al. | 386/52 |
| 2009/0063277 A1* | 3/2009 | Bernosky et al. | 705/14 |
| 2009/0175538 A1* | 7/2009 | Bronstein et al. | 382/173 |
| 2009/0228921 A1* | 9/2009 | Miki et al. | 725/38 |
| 2010/0104184 A1* | 4/2010 | Bronstein et al. | 382/170 |

FOREIGN PATENT DOCUMENTS

| | | |
|---|---|---|
| JP | 2006074586 A | 3/2006 |
| JP | 2006-515721 A | 6/2006 |
| JP | 2006-300970 A | 11/2006 |
| JP | 2007-003597 A | 1/2007 |
| JP | 2007-208631 A | 8/2007 |
| WO | 2006/059436 A1 | 6/2006 |

OTHER PUBLICATIONS

Eiji Kasutani, et al., "Video Material Archive System for Efficient Video Editing Based on Media Identification", Proceedings on International Conference on Multimedia and Expo (ICME 2004), pp. 727-730, vol. 1.

Takuichi Nishimura, et al., "Same Interval Retrieval from Time-Sequence Data Based on Active Search—Reference Interval-Free Time-Series Active Search (RIFAS)—", The Transactions of the Institute of Electronics, Information and Communication Engineers, D-II, Aug. 2001, pp. 1826-1837, vol. J84-D-II, No. 8.

* cited by examiner

CONTENT REPRODUCTION ORDER DETERMINATION SYSTEM, AND METHOD AND PROGRAM THEREOF

TECHNICAL FIELD

The present invention relates to a content reproduction order determination system, and a method and a program thereof.

BACKGROUND ART

The reproduction order of a plurality of contents needs to be determined in a system or an apparatus such as a video sharing service (video hosting site) on Internet in which a large number of the contents are perusable when a plurality of contents are continually reproduced. Additionally, the so-called content in this paper is a content having a time axis including a video content that is comprised of video/audio signals such as a television program, a movie, a home video, and a CGM (Consumer Generated Media) content, and an audio content that is comprised of audio signals such as music. Further, the invention of this paper targets not only the video sharing service (video hosting site) on Internet, but also all of the systems and apparatuses having a large number of the contents such as a video recording apparatus (a hard disc recorder etc.), a video viewing terminal (a set top box etc.), a mobile video player, and a mobile music player.

The method of determining the reproduction order of the contents related to the present invention is described, for example, in Patent Literature 1 and Patent Literature 2.

The method of controlling the reproduction order of the content based upon the past reproduction time quantity and the reproduction interpretation information is described in the Patent Literature 1. The method is described in the Patent Literature 2 of calculating a similarity between a user's preference and the content, and determining the reproduction order so that a similarity between the content to be reproduced based upon the above similarity and the user's preference changes with specific fluctuations.

Further, in general, as a method of determining the reproduction order, there exists the method of employing information called a playlist in which the reproduction order of a plurality of the contents has been pre-specified. As a playlist, the playlist prepared in the past by a user itself (its own favorite one), the playlist prepared by the other users (one recommended by others), or the like can be utilized.

CITATION LIST

Patent Literature

PTL 1: JP-P2007-003597A
PTL 2: JP-P2006-300970A

SUMMARY OF INVENTION

Technical Problem

The methods described in the Patent Literature 1 and Patent Literature 2, however, cause a problem that the reproduction order of a series of a content group in which the details of the content are time-sequentially serialized cannot be correctly determined As one example of a series of the content group in which the details of the content are time-sequentially serialized, for example, a plurality of the contents generated by dividing the originally unitary content into shorter units, or the like are listed. There exist a large number of the content groups generated by dividing the originally unitary content into shorter time sections in the video sharing service (video hosting site) on Internet or the like. The reason why a large number of the content groups exist is that a limitation into up-loading into the video sharing service (video hosting site) (for example, an upper limit of the time length of the content and an upper limit of the size of the content), a limitation to a communication band, or the like is imposed. As another example of a series of the content group in which the details of the content are time-sequentially serialized, for example, there exist the content group that are broadcast in series, or the like. Specifically, a series of the content group is a serial dram program that is broadcast every week, or the like.

In such a manner, it is desirable to determine the correct time-sequential order of a series of the content group in which the details of the content are time-sequentially serialized, and to serially reproduce them in the correct time-sequential order. In particular, for the case of the former, it is more important to determine the correct time-sequential order because they are the contents generated by dividing the originally unitary content.

The methods described in the Patent Literature 1 and the Patent Literature 2, however, are not capable of solving this problematic point.

On the other hand, the method of employing the playlist in which the correct time-sequential reproduction order has been pre-specified causes a problem that the playlist in which the correct time-sequential reproduction order has been specified needs to be previously prepared manually (for example, by a person who produced the content group). In particular, there is almost no possibility that such a playlist is provided by a producer of the content group in the video sharing service (video hosting site) on Internet or the like. Further, it is very difficult for a third person to prepare the playlist because it is required to extract from an enormous volume of the contents a series of the content group in which the details are time-sequentially serialized and to judge whether the above time-sequential order is correct.

Thereupon, the present invention has been accomplished in consideration of the above-mentioned problems, and an object thereof is to provide a content reproduction order determination system of correctly determining the reproduction order of a series of the content group in which the details of the content is time-sequentially serialized, and a method and a program thereof.

Solution to Problem

The present invention for solving the above-mentioned problems is a content reproduction order determination system including a signal feature series extraction means for, when a content group are inputted, extracting from each content a signal feature series, being a series of signal features caused to correspond to positions on a time axis of the content, a mutual similarity section link generating means for detecting mutual similarity sections, being sections in which the signal features for different contents are similar to each other, from the foregoing signal feature series for each content, and generating the content to which each mutual similarity section belongs, information for specifying the position of the above mutual similarity section on the time axis of the content, and a link indicative of a correspondence relation of the mutual similarity section as mutual similarity section link information, and a content reproduction order determination means for determining a reproduction order based upon a relationship of the position of the mutual similarity section on the time axis of the content that the foregoing mutual similarity section link information indicates, and outputting information of the determined reproduction order of the content as content reproduction order information.

The present invention for solving the above-mentioned problems is a content reproduction order determination method including a signal feature series extraction step of, when a content group are inputted, extracting from each content a signal feature series, being a series of signal features caused to correspond to positions on a time axis of the content, a mutual similarity section link generating step of detecting mutual similarity sections, being sections in which the signal features for different contents are similar to each other, from the foregoing signal feature series for each content, and generating the content to which each mutual similarity section belongs, information for specifying the position of the above mutual similarity section on the time axis of the content, and a link indicative of a correspondence relation of the mutual similarity section as mutual similarity section link information, and a content reproduction order determination step of determining a reproduction order based upon a relationship of the position of the mutual similarity section on the time axis of the content that the foregoing mutual similarity section link information indicates, and outputting information of the determined reproduction order of the content as content reproduction order information.

The present invention for solving the above-mentioned problems is a content reproduction order determination program for causing an information processing apparatus to execute a signal feature series extraction process of, when a content group are inputted, extracting from each content a signal feature series, being a series of signal features caused to correspond to positions on a time axis of the content, a mutual similarity section link generating process of detecting mutual similarity sections, being sections in which the signal features for different contents are similar to each other, from the foregoing signal feature series for each content, and generating the content to which each mutual similarity section belongs, information for specifying the position of the above mutual similarity section on the time axis of the content, and a link indicative of a correspondence relation of the mutual similarity section as mutual similarity section link information, and a content reproduction order determination process of determining a reproduction order based upon a relationship of the position of the mutual similarity section on the time axis of the content that the foregoing mutual similarity section link information indicates, and outputting information of the determined reproduction order of the content as content reproduction order information.

Advantageous Effect of Invention

The present invention is capable of correctly determining the reproduction order of a series of the content group in which the details of the content are time-sequentially serialized.

REFERENCE SIGNS LIST

1 signal feature series extraction means
2 mutual similarity section link generating means
3 content reproduction order determination means
4 playlist preparation means

DESCRIPTION OF EMBODIMENTS

First Exemplary Embodiment

Figure 1:
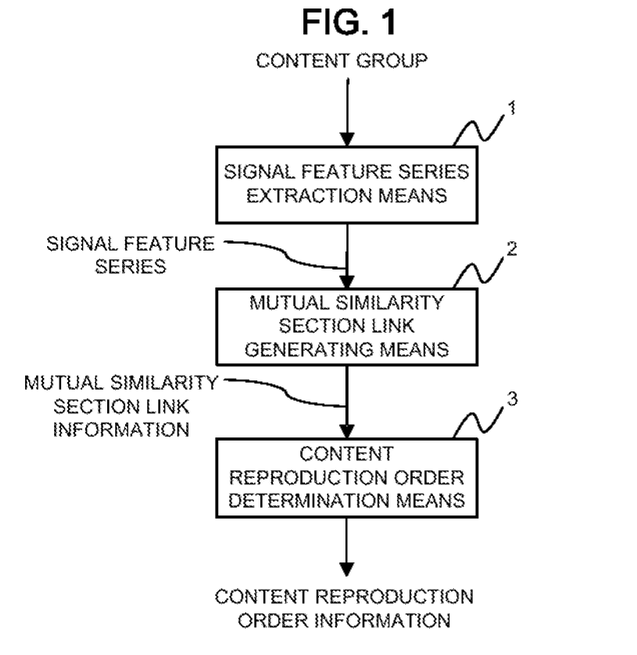
FIG. 1 is a block diagram illustrating a configuration of a first exemplary embodiment of the present invention.

Next, the first exemplary embodiment of the present invention will be explained in details by making a reference to the accompanied drawings. FIG. 1 is a block diagram illustrating a configuration of the content reproduction order determination system related to the first exemplary embodiment. Upon making a reference to FIG. 1, the first exemplary embodiment of the present invention is configured of a signal feature series extraction means 1, a mutual similarity section link generating means 2, and a content reproduction order determination means 3.

When the content group (a plurality of the contents) are inputted, the signal feature series extraction means 1 extracts from each content a signal feature series, being a series of signal features caused to correspond to positions on the time axis of the content (for example, a media time etc.). The signal feature series extraction means 1 supplies the extracted signal feature series for each content to the mutual similarity section link generating means 2.

Herein, the so-called content is a media having the time axis that is comprised of the video signals or the audio signals, or both of the video signals and the audio signals, and for example, a television program, a movie, a home video, a CGM (Consumer Generated Media) content, a music content or the like, and the content is not limited hereto. Further, the content group that is inputted into the signal feature series extraction means 1 is a population, being a target for determining the reproduction order of the contents, and for example, all of the video of the video sharing service (video hosting site) on Internet, a video group restricted under a specific condition (for example, a video group belonging to a specific category, a video group having a specific title, etc.), or the like. For example, the content group could be a video group limited only to the serial drama content. Further, for example, the content group could be a video content group having an identical title or a video content group to which an identical tag (keyword) has been given in the video sharing service (video hosting site) on Internet. In this case, it is enough to refine the video contents based upon the title or the tag (keyword) in the video sharing service (video hosting site) on Internet and to supply them to the signal feature series extraction means 1.

Further, the so-called signal feature is a feature representing the video signals to be included in the content, a feature representing the audio signals to be included in the content, or a feature obtained by combining them.

Herein, for example, image features (visual features) are extracted from images of each frame of the content and used as a series of the signal features representing the video signals. In this case, the signal feature series is caused to correspond to positions on the time axis of the content by use of the frame number caused to correspond to the frame, or the media time of the frame to be calculated based upon it. As the image feature, for example, the feature representing luminance information, the feature representing color information, the feature representing edge information, the feature representing texture information, the feature representing shape information, the feature representing motion information, or the like can be used. Further, dominant color, color layout, scalable color, color structure, edge histogram, homogeneous texture, texture browsing, region shape, contour shape, shape 3D, parametric motion, or motion activity defined by International Standards ISO/IEC 15938-3 may be used, for example.

Alternatively, instead of extracting the image feature from each frame of the content, the image feature may be extracted from only the frames selected at arbitrary sampling intervals, for example. Alternatively, for example, the process such as a cut detection process (a process of detecting a changeover of the video) may be performed to select specific frames, and the image features may be extracted only from the selected frames. Further, alternatively, the content may be divided into sections each having an arbitrary time length, and the image feature of each of a plurality of the frames to be included in each section may be extracted from the section, so that the image features may be consolidated and used. The image features may be consolidated, for example, by determining an average value, a median value, a most frequent value, or a histogram. Further, alternatively, the image features may be extracted only from the pre-specified positions on the specific time axis of the content, for example. Also in these cases, the image features are caused to correspond to the positions on the time axis of the content by use of the frame number caused to correspond to the frame or the section, or the media time to be calculated based upon it.

An arbitrary number of sampling sections in which continuous digital audio signals (audio waveforms) exist (hereinafter, referred to an audio frame) may be analyzed, extracted, and used as a series of the signal features representing the audio signals. For example, by performing a frequency transform such as a Fourier transform for such audio frames and extracting the spectra thereof, an average power of the spectra, an average power for each frequency range, spectrum flatness, spectrum flatness for each frequency range, or the like may be extracted as a signal feature series representing the audio signals. In this case, the signal feature series is caused to correspond to the positions on the time axis of the content by use of the number of the sample point of each audio frame, or the media time to be calculated based upon it. Alternatively, for example, the signal feature series representing the audio signals may be extracted only from the pre-specified positions on the specific time axis of the content.

Additionally, the signal features that the signal feature series extraction means 1 extracts are not limited to the above-mentioned signal features. An arbitrary signal feature may be used so long as the feature represents a video signal to be included in the content, an audio signal to be included in the content, or a combination thereof.

The mutual similarity section link generating means 2 detects the mutual similarity sections, being sections in which the signal features for different contents are similar to each other, from the signal feature series for each content that are supplied from the signal feature series extraction means 1, and generates the content to which each mutual similarity section belongs, information for specifying the position of the above mutual similarity section on the time axis of the content, and a link indicative of a correspondence relation of the mutual similarity section as mutual similarity section link information. The mutual similarity section link generating means 2 supplies the generated mutual similarity section link information to the content reproduction order determination means 3.

As a method of detecting the mutual similarity sections, being sections in which the signal features for different contents are similar to each other, from the signal feature series for each content, for example, the methods of Literature 1 (Eiji Kasutani, Ryoma Oami, Akio Yamada, Takami Sato, and Kyoji Hirata, "Video Material Archive System for Efficient Video Editing based on Media Identification", Proceedings on International Conference on Multimedia and Expo (ICME 2004), Vol. 1, pp 727-730, June 2004.), Literature 2 (NISHIMURA Takuichi, MIZUNO Michinao, OGI Shinobu, SEKIMOTO Nobuhiro, and OKA Ryuichi "Same Interval Retrieval from Time-Sequence Data Based on Active Search: Reference Interval-Free Time: Series Active Search (RIFAS)," The Transactions of the Institute of Electronics, Information and Communication Engineers, D-II, Vol., J84-D-II, No. 8, pp. 1826-1837, August 2001), and Literature 3 (Laid-Open of PCT translation No. 2006-515721) can be employed.

For example, the method of detecting the sections in which the signal features are similar to each other from the signal feature series of the video signals is described in the Literature 1. According to the method of the Literature 1, firstly, the section having a short time length is extracted as a query section (reference section) from the signal feature series. From the remaining sections of the signal feature series (in this-time case, for the different contents), the sections each having the same time length as the query section are sequentially extracted along the time axis, and a similarity to the query section is calculated. An average value of the similarities of the image features among frames corresponding to the sections is used for calculating the similarity. For the sections having a high similarity to the query section, the sections for which the similarity is calculated are extended in negative and positive directions of the time axis, and the start and end points of the sections in which the signal features are similar to each other are determined. When this processing is completed for a certain query section, the next query section is extracted, and the same processing is repeated. In such a manner, the sections in which the signal features are similar to each other can be detected.

Additionally, besides the signal feature series of the video signals, the method described in the Literature 1 can be similarly applied to the signal feature series representing the audio signals. Additionally, when detecting sections in which the signal features are similar to each other, the level of the similarity of the signal features to be detected as similar sections can be arbitrarily determined. Thus, for example, a configuration can be made so that the signal features are regarded to be similar to each other also when the noise such as background sound is mixed in the case that the image has been subjected to the localized processing such as insertion of telop.

While the method described in the Literature 1 detects the mutual similarity sections each having a start point and an end point with the signal feature series extracted from the frame series as a target, the mutual similarity sections that the mutual similarity section link generating means 2 of the present invention detects are not necessarily sections each having a start point and an end point, and the mutual similarity section link generating means 2 may detect the mutual similarity sections, for example, with the unitary frame as a target. The mutual similarity section link generating means 2 may detect, for example, a pair of the frames in which the signal features are similar to each other from the signal feature series extracted from the frame series to regard them as the mutual similarity sections. For example, this method is effective with the case of the image features extracted from the frames selected by applying the process of selecting specific frames such as a cut detection process of the signal feature series (a process of detecting a changeover of the video). Additionally, as a method of detecting a pair of the frames similar to each other, there exists the method of detecting a pair of the frames of which the distance between the image features is equal to or less than a certain threshold (or a pair of the frames of which the similarity is equal to or more than a certain threshold.)

Further, the mutual similarity section link generating means 2, when detecting the mutual similarity sections, may perform a prediction process for the signal features from the supplied signal feature series, predict the signal feature that is temporally ahead of the start point of the content, or the signal feature that is temporally behind the end point of the content, and detect the sections in which the signal features are similar to each other by employing the predicted signal features. A linear prediction, an auto-regressive model, being one kind of the linear prediction, or the like is applicable. Further, a Kalman filter may be applied for the process of predicting the signal features.

Figure 2:
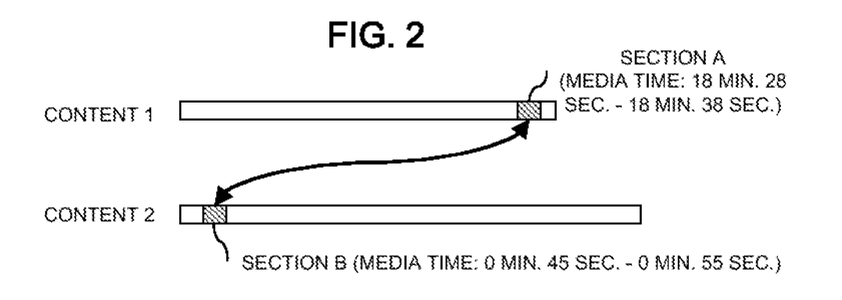
FIG. 2 is a view for explaining one example of the mutual similarity section link.
Figure 3:
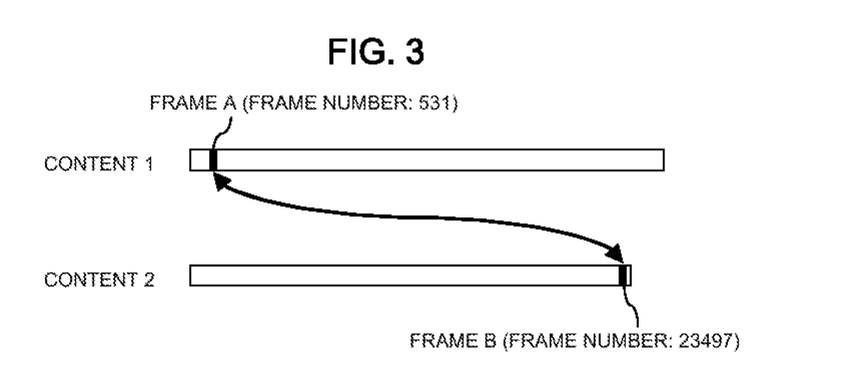
FIG. 3 is a view for explaining one example of the mutual similarity section link.

Upon making a reference to FIG. 2 and FIG. 3, an example of information indicative of the mutual similarity section link information that the mutual similarity section link generating means 2 outputs is shown. FIG. 2 shows an example in which a section A of a content 1 of which the media time ranges from 18 minutes and 28 seconds to 18 minutes and 38 seconds, and a section B of a content 2 of which the media time ranges from zero minute and 45 seconds to zero minute and 55 seconds are detected as mutual similarity sections, being sections similar to each other (the arrow of the figure represents the link). In this case, arbitrary mutual similarity section link information, being information representing the position of the mutual similarity section on the time axis of the content and the link (correspondence relation) of the mutual similarity section may be used so long as it indicates that "the section of the content 1 of which the media time ranges from 18 minutes and 28 seconds to 18 minutes and 38 seconds, and the section of the content 2 of which the media time ranges from zero minute and 45 seconds to zero minute and 55 seconds are links." Further, the media time may be converted into the frame number to represent the position on the time axis of each frame.

FIG. 3 shows an example in which a frame A of the content 1 having a frame number 531 and a frame B of the content 2 having a frame number 23497 are regarded as a pair of the frames similar to each other, and have been detected as the similar similarity sections. In this case, arbitrary mutual similarity section link information may be used so long as it indicates that "the frame of the content 1 having a frame number 531 and the frame of the content 2 having a frame number 23497 are links."

So long as the mutual similarity section link information represents a correspondence relation between the position of the mutual similarity section on the time axis of the content and the mutual similarity section, no special format is required for it. The information representing the position on the time axis of the content, which is not limited to the media time and the frame number, could be, for example, the number of the cut point detected by the cut detection process or the like (or the number of the shot).

The content reproduction order determination means 3 determines the reproduction order of the content based upon a relationship of the position of the mutual similarity section on the time axis of the content that is indicated by the mutual similarity section link information to be supplied from the mutual similarity section link generating means 2, and outputs information of the determined reproduction order of the content as content reproduction order information. Herein, the content reproduction order determination means 3 regards the content pair in which no mutual similarity section exists as a content pair in which the details of the content are not time-sequentially serialized, judges that the above content pair it not a target of the continual reproduction, and outputs.

The content reproduction order determination means 3 outputs for example, information etc. indicating that, "as the reproduction order, content 2 is reproduced after the content 1" to the content pair judged to be a content pair in which the texts of the content are time-sequentially serialized as content reproduction order information.

Hereinafter, the specific method in which the content reproduction order determination means 3 determines the reproduction order of the content will be explained while a reference to the figures is made.

Specific Example 1 of the Method of Determining the Content Reproduction Order

Figure 4:
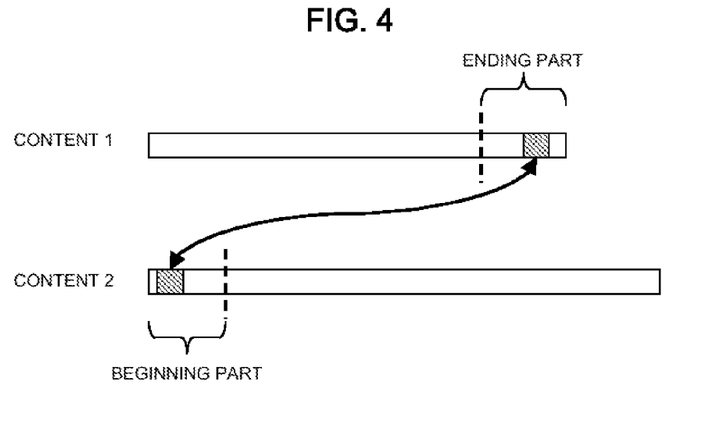
FIG. 4 is a view for explaining a specific example 1 of the method of determining the content reproduction order.

According to the specific example 1 of the method of determining the content reproduction order, the content reproduction order determination means 3 determines the reproduction order in such a manner that the second content is reproduced after the first content when the mutual similarity section link information, which is supplied from the mutual similarity section link generating means 2, includes information indicative of the link between the section to be included in an ending part of the first content, and the section to be included in a beginning part of the second content.

The so-called beginning part of the content points to the section ranging from the start point on the time axis of the content to an end of a certain arbitrary section length. How to determine the section length is arbitrary. For example, the section ranging the start point of the content up to the section length equivalent to 30 seconds may be regard as the beginning part with the specific time defined, for example, as 30 seconds. Further, as the section length, a specific frame number (for example, only the first frame on the time axis of the content may be regarded as the beginning part), a specific shot number, or the like may be employed. Further, the section length may be defined, for example, as a certain arbitrary ratio over an entire length of the content, for example, as a length of $\frac{1}{10}$ the entire length of the content.

The so-called ending part of the content points to the section ranging from the end point on the time axis of the content to a head of a certain arbitrary section length. How to determine the section length is arbitrary similarly to the case of the beginning part.

FIG. 4 is a view for explaining the specific example 1 of the method of determining the content reproduction order. The mutual similarity section link information that FIG. 4 represents is indicative of the link between the section to be included in the ending part of the content 1, and the section to be included in the beginning part of the content 2. In this case, the content reproduction order determination means 3 determines the reproduction order in such a manner that the content 2 is reproduced after the content 1.

When the specific example 1 of the method of determining the content reproduction order is applied, processing targets of the signal feature series extraction means 1 and the mutual similarity section link generating means 2 can be restricted. That is, the signal feature series extraction means 1 may extract the signal feature series only from the beginning part and the ending part of the content. Further, the mutual similarity section link generating means 2 may detect the mutual simulation sections, being sections in which the signal features are similar to each other, with only the ending part of a certain content and the beginning part of another content as a target. Restricting the processing targets yields an effect that the calculation cost can be reduced and the faster process can be realized because the redundant process can be reduced.

Next, an effect of the specific example 1 of the method of determining the content reproduction order will be explained. The specific example 1 of the method of determining the content reproduction order yields an effect that the correct reproduction order in which a plurality of the contents generated by dividing the originally unitary content into the shorter time sections are time-sequentially serialized can be automatically determined. The reason is that in the contents generated by dividing the originally unitary content into the shorter time sections, the ending part of the content that is temporally ahead, being one of the temporally neighboring two contents, and the beginning part of the content that is temporally behind, being one of the temporally neighboring two contents, are similar to each other. For example, the final frame of the former and the initial frame of the latter, each of which is regarded as an almost identical image, are similar to each other. (Additionally, employing the prediction process at the moment of detecting the mutual similarity section, as described at the moment of explaining the mutual similarity section link generating means 2, yields an effect that the correct reproduction order of a plurality of the contents generated by dividing the originally unitary content into the shorter time sections can be more accurately determined.

In addition, at the moment of generating a plurality of the contents by dividing the originally unitary content into the shorter time sections, the ending part and the beginning part of the temporally neighboring two contents are partially superposed in many cases. In this case, the correct production order in which the contents are time-sequentially serialized can be determined more accurately because the completely identical section (the sections coincident with each other) exists in the ending part of the content that is temporally ahead, being one of the temporally neighboring two contents, and the beginning part of the content that is temporally behind, being one of the temporally neighboring two contents (that is, a similarity between these sections coincident with each other is extremely high).

Specific Example 2 of the Method of Determining the Content Reproduction Order

Figure 5:
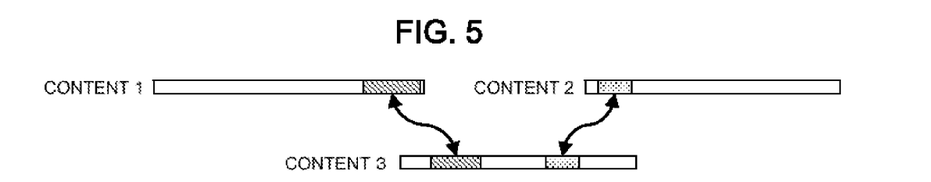
FIG. 5 is a view for explaining a specific example 2 of the method of determining the content reproduction order.

According to the specific example 2 of the method of determining the content reproduction order, the content reproduction order determination means 3 determines the reproduction order in such a manner that the second content is reproduced after the first content when the mutual similarity section link information, which is supplied from the mutual similarity section link generating means 2, includes information indicative of the link between the section to be included in the first content and the section to be included in the third content, and information indicative of the link between the section to be included in the second content and the section to be included in the third content, and yet the mutual similarity section to the first content exists ahead of the mutual similarity section to the second content on the time axis in the third content. Additionally, when the mutual similarity section to the first content and the mutual similarity section to the second content are partially overlapped in the third content, the section in which the start point of each section exists ahead on the time axis may be determined to be a section that exists ahead, the section in which the end point of each section exists ahead on the time axis may be determined to be a section that exists ahead, and the intermediate point defined based upon an arbitrary criteria may be employed to determine the section in which the intermediate point of each section exists ahead on the time axis to be a section that exists ahead.

FIG. 5 is a view for explaining the specific example 2 of the method of determining the content reproduction order. The mutual similarity section link information that FIG. 5 represents is indicative of the link between the section to be included in the content 1 and the section to be included in the content 3, and the link between the section to be included in the content 2 and the section to be included in the content 3, and yet the mutual similarity section to the content 1 exists ahead of the mutual similarity section to the content 2 on the time axis in the content 3. In this case, the content reproduction order determination means 3 determines the reproduction order in such a manner the content 2 is reproduced after the content 1.

Next, an effect of the specific example 2 of the method of determining the content reproduction order will be explained. The specific example 2 of the method of determining the content reproduction order yields an effect that the correct reproduction order in which a plurality of the contents generated by dividing the originally unitary content into the shorter time sections are time-sequentially serialized can be determined more accurately as compared with the case of the specific example 1 of the method of determining the content reproduction order. The reason is that the third content including one part (including the similarity section) of the first content and the second content generated with the different dividing method explicitly indicates the time-sequential order of the first content and the second content generated by dividing the originally unitary content into the shorter time sections, which temporally neighbor each other. Namely, the reason is that the reproduction order of the first content and the second content can be correctly determined by utilizing the third content as mediation.

In addition, the specific example 2 of the method of determining the content reproduction order yields an effect that utilizing the third content as mediation makes it possible to determine the time-sequentially correct reproduction order also when a temporal gap (interruption) exists between the first content and the second content generated by dividing the originally unitary content into the shorter time sections, which temporally neighbor each other (that is, when a temporal gap (interruption) exists also in the case that the first content and the second content are linked), and the mutual similarity sections cannot be detected between the ending part of the first content and the beginning part of the second content.

Figure 6:
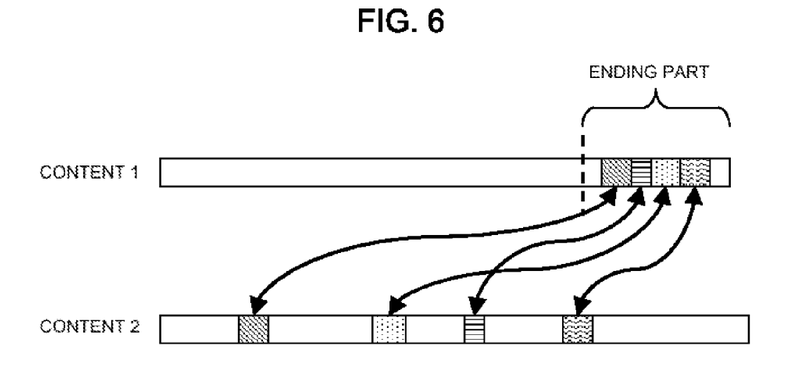
FIG. 6 is a view for explaining a specific example 3 of the method of determining the content reproduction order.

Specific Example 3 of the Method of Determining the Content Reproduction Order According to the specific example 3 of the method of determining the content reproduction order, the content reproduction order determination means 3 determines the reproduction order in such a manner that the second content is reproduced after the first content when the mutual similarity section link information, which is supplied from the mutual similarity section link generating means 2, includes information indicative of the link between the section to be included in the ending part of the first content and the section to be included in the second content in a plural number.

In addition, in the specific example 3 of the method of determining the content reproduction order, the content reproduction order determination means 3 may determine the reproduction order in such a manner that the second content is reproduced after the first content when the mutual similarity section link information, which is supplied from the mutual similarity section link generating means 2, includes information indicative of the link between the section to be included in the ending part of the first content and the section to be included in the second content in a plural number, and yet respective mutual similarity sections are continued on the time axis in the first content.

Additionally, the so-called ending part of the content is one already explained in the specific example 1 of the method of determining the content reproduction order.

FIG. 6 is a view for explaining the specific example 3 of the method of determining the content reproduction order. The mutual similarity section link information that FIG. 6 represents is indicative of a plurality of the links between the sections to be included in the ending part of the content 1, and the sections to be included in the content 2 (the sections to be included in the entirety of the content 2). In addition, respective mutual similarity sections are continued on the time axis in the content 1. In this case, the content reproduction order determination means 3 determines the reproduction order in such a manner that the content 2 is reproduced after the content 1.

When the specific example 3 of the method of determining the content reproduction order is applied, processing targets of the mutual similarity section link generating means 2 can be restricted. That is, the mutual similarity section link generating means 2 may regard the ending part of a certain content and all of the sections of another content as a detection target of the mutual similarity section (that is, the mutual similarity section link generating means 2 may detect the mutual similarity section for one content, out of the contents that are compared, with only the ending part thereof as a target). Restricting the processing targets yields an effect that the calculation cost can be reduced and the faster process can be realized because the redundant process can be reduced.

Next, an effect of the specific example 3 of the method of determining the content reproduction order will be explained. The specific example 3 of the method of determining the content reproduction order yields an effect that the correct reproduction order, in which the content group of the series such as the continual drama contents (for example, the continual dram programs that are broadcast every week) are time-sequentially serialized, can be automatically determined. The reason is that, in many content groups of the series such as the continual dram contents, a "trailer" section (which is detected as a mutual similarity section because it is generated by extraction) generated by extracting a plurality of the partial sections of the next-time content (the content that is time-sequentially next) is often inserted into the ending part of the content. Applying the specific example 3 of the method of determining the content reproduction order allows the link between the "trailer" section of the first content and the section extracted for preparing the "trailer" of the second content to be detected, thereby making it possible to determine that the content next to the first content (the next-time content) is the second content based upon the relationship thereof.

Figure 7:
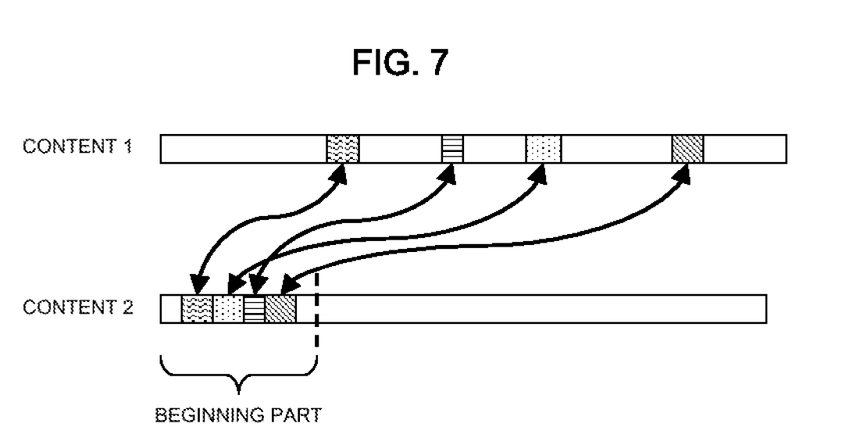
FIG. 7 is a view for explaining a specific example 4 of the method of determining the content reproduction order.

Specific Example 4 of the Method of Determining the Content Reproduction Order According to the specific example 4 of the method of determining the content reproduction order, the content reproduction order determination means 3 determines the reproduction order in such a manner that the second content is reproduced after the first content when the mutual similarity section link information, which is supplied from the mutual similarity section link generating means 2, includes information indicative of the link between the section to be included in the first content and the section to be included in the beginning part of the second content in a plural number.

In addition, in the specific example 4 of the method of determining the content reproduction order, the content reproduction order determination means 3 may determine the reproduction order in such a manner that the second content is reproduced after the first content when the mutual similarity section link information, which is supplied from the mutual similarity section link generating means 2, includes information indicative of the link between the section to be included in the first content and the section to be included in the beginning part of the second content in a plural number, and yet respective mutual similarity sections are continued on the time axis in the second content. Additionally, the so-called beginning part of the content is one already explained in the specific example 1 of the method of determining the content reproduction order.

FIG. 7 is a view for explaining the specific example 4 of the method of determining the content reproduction order. The mutual similarity section link information that FIG. 7 represents is indicative of a plurality of the links between the sections to be included in the content 1 (the sections to be included in the entirety of the content 1), and the sections to be included in the beginning part of the content 2. In addition, respective mutual similarity sections are continued on the time axis in the content 2. In this case, the content reproduction order determination means 3 determines the reproduction order in such a manner that the content 2 is reproduced after the content 1.

When the specific example 4 of the method of determining the content reproduction order is applied, processing targets of the mutual similarity section link generating means 2 can be restricted. That is, the mutual similarity section link generating means 2 may regard the beginning part of a certain content and all of the sections of another content as a detection target of the mutual similarity section (that is, the mutual similarity section link generating means 2 may detect the mutual similarity section for one content, out of the contents that are compared, with only the beginning part thereof as a target). Restricting the processing targets yields an effect that the calculation cost can be reduced and the faster process can be realized because the redundant process can be reduced.

Next, an effect of the specific example 4 of the method of determining the content reproduction order will be explained. The specific example 4 of the method of determining the content reproduction order yields an effect that the correct reproduction order in which the content group of the series such as the continual drama contents (for example, the continual dram programs that are broadcast every week) are time-sequentially serialized can be automatically determined. The reason is that, in many content groups of the series such as the continual dram contents, "a going-over edition" section (which is also called "a reflection" section, "an outline-of-previous-content" section, "a review" section, etc.) generated by extracting a plurality of the partial sections of the last-time content (the content that is time-sequentially ahead) is often inserted into the beginning part of the content. Applying the specific example 4 of the method of determining the content reproduction order allows the link between the section extracted for preparing "the going-over edition" section of the first content and "the going-over edition" section of the second content to be detected, thereby making it possible to determine that the content prior to the second content (the last-time content) is the first content (that is, the content next to the first content (next-time content) is the second content) based upon the relationship thereof.

Above, while the four specific examples in which the content reproduction order determination means 3 determined the reproduction order of the content were explained, it is apparent that a plurality of these methods may be applied in some cases, and a plurality of these methods may be combined for application in some cases.

Further, the content reproduction order determination means 3 can link the determined two reproduction orders of the contents, determine the reproduction order of three contents or more, and output it as content reproduction order information. For example, when the content reproduction order determination means 3 determines the reproduction order in such a manner that "the content 2 is reproduced after the content 1" for the content 1 and the content 2, and further determines the reproduction order in such a manner that "the content 3 is reproduced after the content 2" for the content 2 and the content 3, it can link these and determine the reproduction order in such a manner of "content 1→content 2→content 3" (herein, the arrow represents the reproduction order). In this case, the content reproduction order determination means 3 outputs information indicating that "the reproduction order is content 1→content 2→content 3" as the content reproduction order information.

Figure 8:
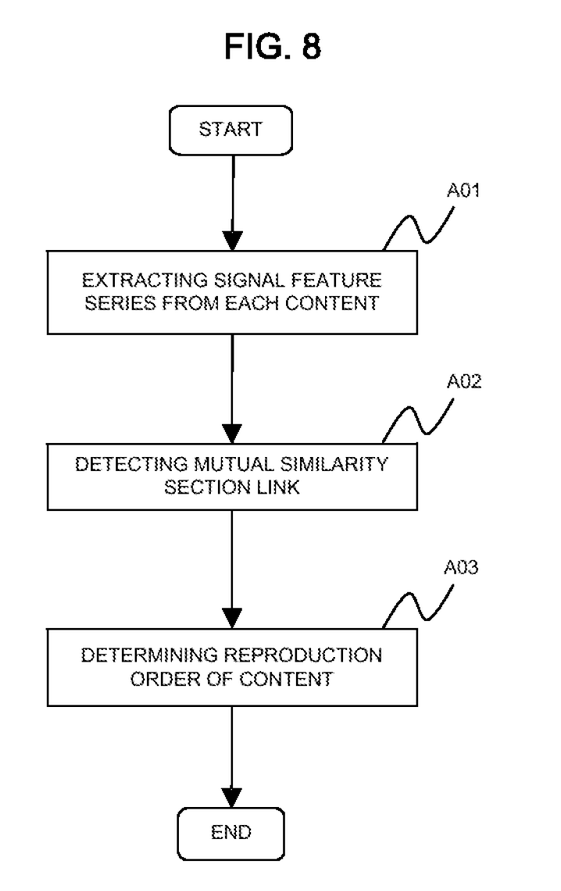
FIG. 8 is a flowchart illustrating an operation of the first exemplary embodiment of the present invention.

Next, an operation of the first exemplary embodiment will be explained by utilizing a flowchart of FIG. 8. FIG. 8 is a flowchart illustrating an operation of the content reproduction order determination system in the first exemplary embodiment.

At first, when the content group (a plurality of the contents) are inputted, the signal feature series extraction means 1 extracts from each content the signal feature series, being a series of signal features caused to correspond to positions on the time axis of the content, and supplies the extracted signal feature series for each content to the mutual similarity section link generating means 2 (step A01). Next, the mutual similarity section link generating means 2 detects the mutual similarity sections, being sections in which the signal features for different content are similar to each other, from the signal feature series for each content, and generates the content to which each mutual similarity section belongs, information for specifying the position on the time axis, and the link indicative of a correspondence relation of the mutual similarity section as mutual similarity section link information, and supplies the generated mutual similarity section link information to the content reproduction order determination means 3 (step A02). Finally, the content reproduction order determination means 3 determines the reproduction order of the content based upon a relationship of the position of the mutual similarity section on the time axis of the content that the mutual similarity section link indicates, and outputs information of the determined reproduction order of the content as content reproduction order information (step A03).

The first exemplary embodiment of the present invention yields an effect that the reproduction order of a series of the content group in which the details of the content are time-sequentially serialized can be correctly determined in an automatic manner. This yields an effect that a series of the content group in which the details of the content are time-sequentially serialized can be serially reproduced in the correct time-sequential order. The reason is that a series of the content group in which the details of the content are time-sequentially serialized have the mutual similarity sections in which the signal features for the contents are similar to each other in many cases, thereby making it possible to judging the correct reproduction order of the content based upon a relationship of the position on the time axis of the content. The mutual similarity section link generating means 2 of the present invention detects the above mutual similarity sections, and the content reproduction order determination means 3 correctly determines the reproduction order of the content based upon the above relationship of the position on the time axis of the content. Additionally, a specific example of the effect of the first exemplary embodiment is one already explained in the specific example 1 to the specific example 4 of the method of determining the content reproduction order.

Second Exemplary Embodiment

Figure 9:
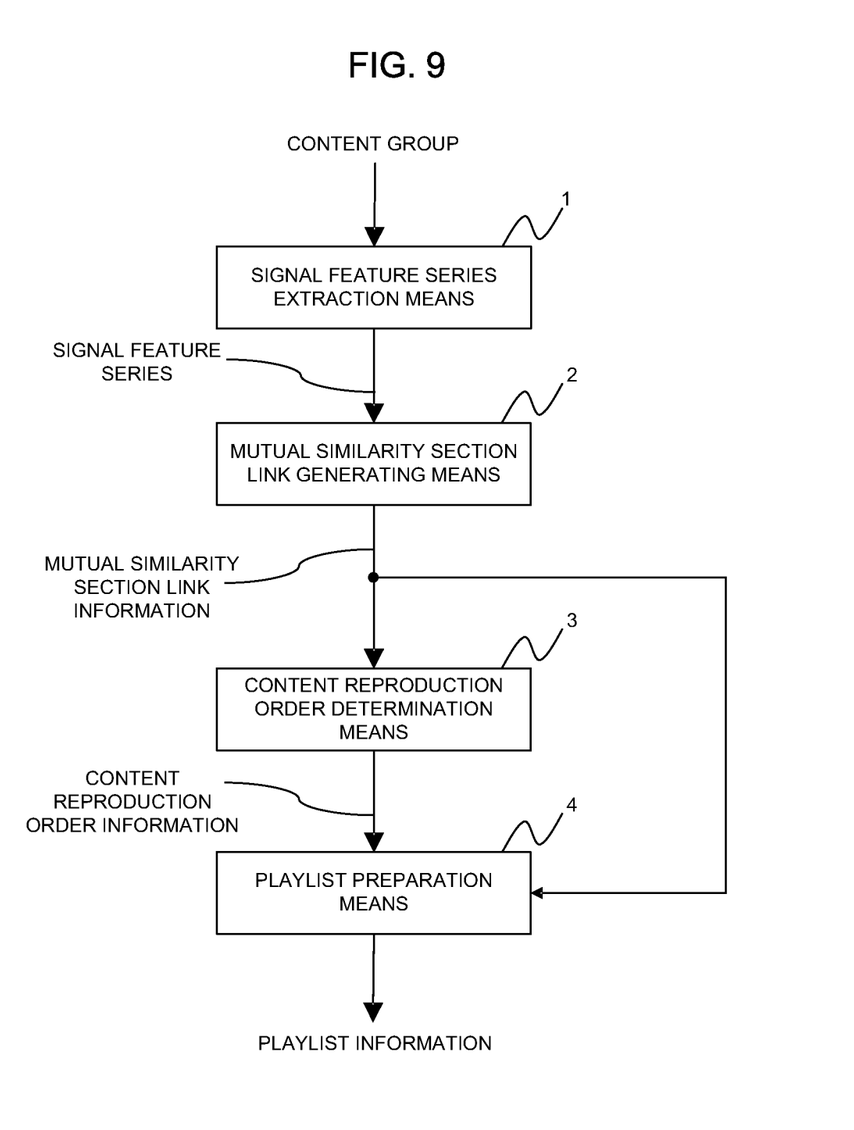
FIG. 9 is a block diagram illustrating a configuration of a second exemplary embodiment of the present invention.

Next, the second exemplary embodiment of the present invention will be explained in details by making a reference to the accompanied drawings. FIG. 9 is a block diagram illustrating a configuration of the content reproduction order determination system related to the second exemplary embodiment. Upon making a reference to FIG. 9, the second exemplary embodiment of the present invention differs from the first exemplary embodiment in a point that it has a playlist preparation means 4 further added besides a configuration of the first exemplary embodiment of the present invention shown in FIG. 1, and yet the mutual similarity section link information that the mutual similarity section link generating means 2 outputs is supplied to the playlist preparation means 4 as well. The second exemplary embodiment is identical to the first exemplary embodiment in the points other than it, so only the point in which the second exemplary embodiment differs from the first exemplary embodiment will be explained herein.

The playlist preparation means 4 outputs the reproduction order of the content, and playlist information in which the reproduction section has been specified so that the mutual similarity section is not repeatedly reproduced based upon the content reproduction order information to be supplied from the content reproduction order determination means 3, and the mutual similarity section link information to be supplied from the mutual similarity section link generating means 2.

Figure 10:
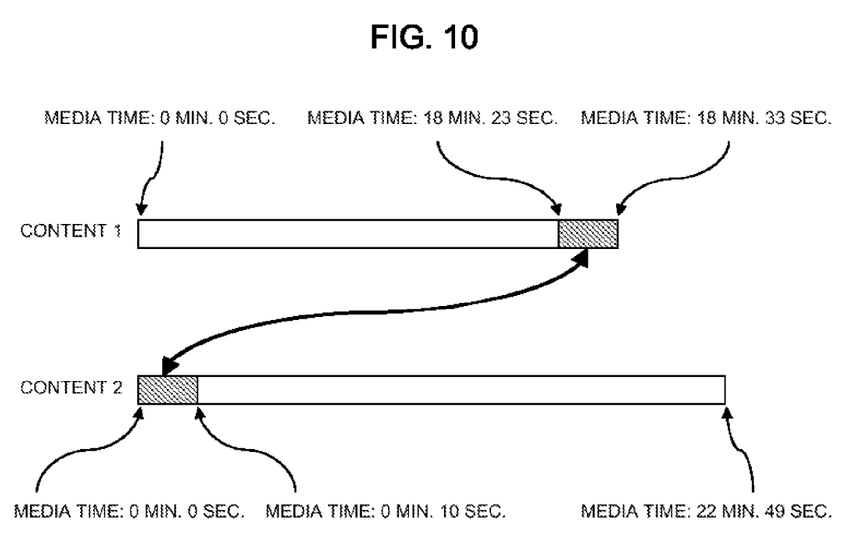
FIG. 10 is a view for explaining an operation of a playlist generating means 4.

A specific example of an operation of the playlist preparation means 4 will be explained by making a reference to FIG. 10. FIG. 10 is a view illustrating that the mutual similarity section link information to be supplied from the mutual similarity section link generating means 2 indicates a link between the section ranging from media time 18 minutes and 23 seconds to 18 minutes and 33 seconds of the content 1 and the section ranging from media time zero minute and zero second to zero minute and 10 seconds of the content 2, and that the content reproduction order information to be supplied from the content reproduction order determination means 3 indicates that the reproduction order is "the content 2 after the content 1". Herein, when the content 2 is reproduced after the content 1 as it stands, it follows that the section ranging from media time 18 minutes and 23 seconds to 18 minutes and 33 seconds of the content 1, and the section ranging from media time zero minute and zero second to zero minute and 10 seconds of the content 2, each of which is the mutual similarity section, are reproduced in a duplicated manner, whereby redundancy is brought about. Thereupon, the playlist preparation means 4 specifies the reproduction section so that the section ranging from media time 18 minutes and 23 seconds to 18 minutes and 33 seconds of the content 1 and the section ranging from media time zero minute and zero second to zero minute and 10 seconds of the content 2 are not reproduced in a duplicated manner, and generates the playlist information. That is, the playlist preparation means 4 specifies and outputs, as the playlist, for example, the reproduction section and the reproduction order of "the section ranging from media time zero minute and zero second to 18 minutes 33 seconds of the content 1→the section ranging from media time zero minute and 10 seconds to 22 minutes and 49 seconds of the content 2" or "the section ranging from media time zero minute and zero second to 18 minutes and 23 seconds of the content 1→the section ranging from media time zero minute and zero second to 22 minutes and 49 seconds of the content 2" (herein, the arrow represents the reproduction order).

The second exemplary embodiment of the present invention yields an effect that the user does not need to repeatedly view the mutual similarity section because the playlist information is outputted in which the reproduction section has been specified so that the mutual similarity section is not repeatedly reproduced in addition to the effect of the first exemplary embodiment of the present invention.

Additionally, while each part was configured with hardware in the above-mentioned exemplary embodiments, it may be configured with the information processing apparatus such as CPU that operates under a program. In this case, the program causes the information processing apparatus such as CPU to execute the above-described operation.

The first mode of the present invention is characterized in that a content reproduction order determination system, comprising: a signal feature series extraction means for, when a content group are inputted, extracting from each content a signal feature series, being a series of signal features caused to correspond to positions on a time axis of the content; a mutual similarity section link generating means for detecting mutual similarity sections, being sections in which the signal features for different contents are similar to each other, from said signal feature series for each content, and generating the content to which each mutual similarity section belongs, information for specifying the position of the above mutual similarity section on the time axis of the content, and a link indicative of a correspondence relation of the mutual similarity section as mutual similarity section link information; and a content reproduction order determination means for determining a reproduction order of the content based upon a relationship of the position of the mutual similarity section on the time axis of the content that said mutual similarity section link information indicates, and outputting information of the determined reproduction order of the content as content reproduction order information.

The second mode of the present invention, in the above-mentioned mode, is characterized in that said content is a media having a time axis, said media configured of video signals or audio signals, or both of the video signals and the audio signals.

The third mode of the present invention, in the above-mentioned mode, is characterized in that said signal feature series includes at least one of a feature representing the video signals to be included in the content, and a feature representing the audio signals to be included in the content.

The fourth mode of the present invention, in the above-mentioned mode, is characterized in that said mutual similarity section link generating means performs a process of predicting the signal features from said signal feature series when detecting the mutual similarity sections.

The fifth mode of the present invention, in the above-mentioned mode, is characterized in that said content reproduction order determination means determines that a content pair in which no mutual similarity section exists is not a target of continual reproduction based upon said mutual similarity section link information.

The sixth mode of the present invention, in the above-mentioned mode, is characterized in that said content reproduction order determination means determines the reproduction order in such a manner that a second content is reproduced after a first content when said mutual similarity section link information includes information indicative of a link between the section to be included in an ending part, being a section ranging from an end point on the time axis of the first content to a head of a certain arbitrary section length, and the section to be included in a beginning part, being a section ranging from a start point on the time axis of the second content to an end of a certain arbitrary section length.

The seventh mode of the present invention, in the above-mentioned mode, is characterized in that said content reproduction order determination means determines the reproduction order in such a manner that the second content is reproduced after the first content when said mutual similarity section link information includes information indicative of a link between the section to be included in the first content and the section to be included in a third content, and a link between the section to be included in the second content and the section to be included in the third content, and yet the mutual similarity section to the first content exists ahead of the mutual similarity section to the second content on the time axis in the third content.

The eighth mode of the present invention, in the above-mentioned mode, is characterized in that said content reproduction order determination means determines the reproduction order in such a manner that the second content is reproduced after the first content when said mutual similarity section link information includes information indicative of a link between the section to be included in an ending part, being a section ranging from an end point on the time axis of the first content to a head of a certain arbitrary section length, and the section to be included in the second content in a plural number.

The ninth mode of the present invention, in the above-mentioned mode, is characterized in that said content reproduction order determination means determines the reproduction order in such a manner that the second content is reproduced after the first content when said mutual similarity section link information includes information indicative of a link between the section to be included in an ending part, being a section ranging from an end point on the time axis of the first content to a head of a certain arbitrary section length, and the section to be included in the second content in a plural number, and yet respective mutual similarity sections are continued on the time axis in the first content.

The tenth mode of the present invention, in the above-mentioned mode, is characterized in that said content reproduction order determination means determines the reproduction order in such a manner that the second content is reproduced after the first content when said mutual similarity section link information includes information indicative of a link between the section to be included in the first content and the section to be included in the beginning part, being a section ranging from a start point on the time axis of the second content to an end of a certain arbitrary section length, in a plural number.

The eleventh mode of the present invention, in the above-mentioned mode, is characterized in that said content reproduction order determination means determines the reproduction order in such a manner that the second content is reproduced after the first content when said mutual similarity section link information includes information indicative of a link between the section to be included in the first content and the section to be included in the beginning part, being a section ranging from a start point on the time axis of the second content to an end of a certain arbitrary section length, in a plural number, and yet respective mutual similarity sections are continued on the time axis in the second content.

The twelfth mode of the present invention, in the above-mentioned mode, is characterized in that said content reproduction order determination system, comprising a playlist preparation means for, based upon said content reproduction order information and said mutual similarity section link information, outputting the reproduction order of the content, and playlist information in which the reproduction section has been specified so that the mutual similarity section is not reproduced in a duplicated manner.

The thirteenth mode of the present invention is characterized in that a content reproduction order determination method comprising: a signal feature series extraction step of, when a content group are inputted, extracting from each content a signal feature series, being a series of signal features caused to correspond to positions on a time axis of the content; a mutual similarity section link generating step of detecting mutual similarity sections, being sections in which the signal features for different contents are similar to each other, from said signal feature series for each content, and generating the content to which each mutual similarity section belongs, information for specifying the position of the above mutual similarity section on the time axis of the content, and a link indicative of a correspondence relation of the mutual similarity section as mutual similarity section link information; and a content reproduction order determination step of determining a reproduction order of the content based upon a relationship of the position of the mutual similarity section on the time axis of the content that said mutual similarity section link information indicates, and outputting information of the determined reproduction order of the content as content reproduction order information.

The fourteenth mode of the present invention, in the above-mentioned mode, is characterized in that said content is a media having a time axis, said media configured of video signals or audio signals, or both of the video signals and the audio signals.

The fifteenth mode of the present invention, in the above-mentioned mode, is characterized in that said signal feature series includes at least one of a feature representing the video signals to be included in the content, and a feature representing the audio signals to be included in the content.

The sixteenth mode of the present invention, in the above-mentioned mode, is characterized in that said mutual similarity section link generating step performs a process of predicting the signal features from said signal feature series when detecting the mutual similarity sections.

The seventeenth mode of the present invention, in the above-mentioned mode, is characterized in that said content reproduction order determination step determines that a content pair in which no mutual similarity section exists is not a target of continual reproduction based upon said mutual similarity section link information.

The eighteenth mode of the present invention, in the above-mentioned mode, is characterized in that said content reproduction order determination step determines the reproduction order in such a manner that a second content is reproduced after a first content when said mutual similarity section link information includes information indicative of a link between the section to be included in an ending part, being a section ranging from an end point on the time axis of the first content to a head of a certain arbitrary section length, and the section to be included in a beginning part, being a section ranging from a start point on the time axis of the second content to an end of a certain arbitrary section length.

The nineteenth mode of the present invention, in the above-mentioned mode, is characterized in that said content reproduction order determination step determines the reproduction order in such a manner that the second content is reproduced after the first content when said mutual similarity section link information includes information indicative of a link between the section to be included in the first content and the section to be included in a third content, and a link between the section to be included in the second content and the section to be included in the third content, and yet the mutual similarity section to the first content exists ahead of the mutual similarity section to the second content on the time axis in the third content.

The twentieth mode of the present invention, in the above-mentioned mode, is characterized in that said content reproduction order determination step determines the reproduction order in such a manner that the second content is reproduced after the first content when said mutual similarity section link information includes information indicative of a link between the section to be included in an ending part, being a section ranging from an end point on the time axis of the first content to a head of a certain arbitrary section length, and the section to be included in the second content in a plural number.

The twenty-first mode of the present invention, in the above-mentioned mode, is characterized in that said content reproduction order determination step determines the reproduction order in such a manner that the second content is reproduced after the first content when said mutual similarity section link information includes information indicative of a link between the section to be included in an ending part, being a section ranging from an end point on the time axis of the first content to a head of a certain arbitrary section length, and the section to be included in the second content in a plural number, and yet respective mutual similarity sections are continued on the time axis in the first content.

The twenty-second mode of the present invention, in the above-mentioned mode, is characterized in that said content reproduction order determination step determines the reproduction order in such a manner that the second content is reproduced after the first content when said mutual similarity section link information includes information indicative of a link between the section to be included in the first content and the section to be included in the beginning part, being a section ranging from a start point on the time axis of the second content to an end of a certain arbitrary section length, in a plural number.

The twenty-third mode of the present invention, in the above-mentioned mode, is characterized in that said content reproduction order determination step determines the reproduction order in such a manner that the second content is reproduced after the first content when said mutual similarity section link information includes information indicative of a link between the section to be included in the first content and the section to be included in the beginning part, being a section ranging from a start point on the time axis of the second content to an end of a certain arbitrary section length, in a plural number, and yet respective mutual similarity sections are continued on the time axis in the second content.

The twenty-fourth mode of the present invention, in the above-mentioned mode, is characterized in that said content reproduction order determination method comprising a playlist preparation step of, based upon said content reproduction order information and said mutual similarity section link information, outputting the reproduction order of the content, and playlist information in which the reproduction section has been specified so that the mutual similarity section is not reproduced in a duplicated manner.

The twenty-fifth mode of the present invention is characterized in that a content reproduction order determination program for causing an information processing apparatus to execute: a signal feature series extraction process of, when a content group are inputted, extracting from each content a signal feature series, being a series of signal features caused to correspond to positions on a time axis of the content; a mutual similarity section link generating process of detecting mutual similarity sections, being sections in which the signal features for different contents are similar to each other, from said signal feature series for each content, and generating the content to which each mutual similarity section belongs, information for specifying the position of the above mutual similarity section on the time axis of the content, and a link indicative of a correspondence relation of the mutual similarity section as mutual similarity section link information; and a content reproduction order determination process of determining a reproduction order of the content based upon a relationship of the position of the mutual similarity section on the time axis of the content that said mutual similarity section link information indicates, and outputting information of the determined reproduction order of the content as content reproduction order information.

Above, although the present invention has been particularly described with reference to the preferred embodiments and modes thereof, it should be readily apparent to those of ordinary skill in the art that the present invention is not always limited to the above-mentioned embodiment and modes, and changes and modifications in the form and details may be made without departing from the spirit and scope of the invention.

This application is based upon and claims the benefit of priority from Japanese patent application No. 2008-167343, filed on Jun. 26, 2008, the disclosure of which is incorporated herein in its entirety by reference.

INDUSTRIAL APPLICABILITY

As an example of putting the present invention into practical use, the playlist of a series of the content group in which the details of the content are time-sequentially serialized is automatically prepared, for example, in the system of reproducing/perusing the contents with a large volume of the contents as a target such as the video sharing service (video hosting site) on Internet, thereby enabling the continual reproduction of the contents to be realized.

The invention claimed is:

1. A content reproduction order determination system, comprising:

a signal feature series extraction unit that, when separate contents are inputted, extracts from each content a signal feature series, being a series of signal features caused to correspond to positions on a time axis of the content;

a mutual similarity section link generator that detects mutual similarity sections, being sections in which the signal features for different contents are similar to each other, from said signal feature series for each content, and generates information for specifying the contents to which each mutual similarity section belongs and, a position of each mutual similarity section on the time axis of each content, and a link indicative of a correspondence relation of said each mutual similarity section, as mutual similarity section link information; and a content reproduction order determination unit that detects a mutual similarity section located in a beginning part or an ending part on the time axis of the content from mutual similarity section link information, and determines a correct time-sequential reproduction order of said contents to which each mutual similarity section belongs based upon a relationship of the positions of said detected mutual similarity section and the mutual similarity section corresponding to said detected mutual similarity section on the time axis of each content that said mutual similarity section link information indicates, and outputs information of the determined correct time-sequential reproduction order of said contents as content reproduction order information.

2. A content reproduction order determination system according to claim 1, wherein said content is a media having a time axis, said media configured of video signals or audio signals, or both of the video signals and the audio signals.

3. A content reproduction order determination system according to claim 1, wherein said signal feature series includes at least one of a feature representing the video signals to be included in the content, and a feature representing the audio signals to be included in the content.

4. A content reproduction order determination system according to claim 1, wherein said mutual similarity section link generator performs a process of predicting the signal features from said signal feature series when detecting the mutual similarity sections.

5. A content reproduction order determination system according to claim 1, wherein said content reproduction order determination unit determines that a content pair in which no mutual similarity section exists is not a target of continual reproduction based upon said mutual similarity section link information.

6. A content reproduction order determination system according to claim 1, wherein said content reproduction order determination unit determines the reproduction order in such a manner that a second content is reproduced after a first content when said mutual similarity section link information includes information indicative of a link between the section to be included in an ending part, being a section ranging from an end point on the time axis of the first content to a head of a certain arbitrary section length, and the section to be included in a beginning part, being a section ranging from a start point on the time axis of the second content to an end of a certain arbitrary section length.

7. A content reproduction order determination system according to claim 1, wherein said content reproduction order determination unit determines the reproduction order in such a manner that the second content is reproduced after the first content when said mutual similarity section link information includes information indicative of a link between the section to be included in the first content and the section to be included in a third content, and a link between the section to be included in the second content and the section to be included in the third content, and yet the mutual similarity section to the first content exists ahead of the mutual similarity section to the second content on the time axis in the third content.

8. A content reproduction order determination system according to claim 1, wherein said content reproduction order determination unit determines the reproduction order in such a manner that the second content is reproduced after the first content when said mutual similarity section link information includes information indicative of a link between the section to be included in an ending part, being a section ranging from an end point on the time axis of the first content to a head of a certain arbitrary section length, and the section to be included in the second content in a plural number.

9. A content reproduction order determination system according to claim 1, wherein said content reproduction order determination unit determines the reproduction order in such a manner that the second content is reproduced after the first content when said mutual similarity section link information includes information indicative of a link between the section to be included in an ending part, being a section ranging from an end point on the time axis of the first content to a head of a certain arbitrary section length, and the section to be included in the second content in a plural number, and yet respective mutual similarity sections are continued on the time axis in the first content.

10. A content reproduction order determination system according to claim 1, wherein said content reproduction order determination unit determines the reproduction order in such a manner that the second content is reproduced after the first content when said mutual similarity section link information includes information indicative of a link between the section to be included in the first content and the section to be included in the beginning part, being a section ranging from a start point on the time axis of the second content to an end of a certain arbitrary section length, in a plural number.

11. A content reproduction order determination system according to claim 1, wherein said content reproduction order determination unit determines the reproduction order in such a manner that the second content is reproduced after the first content when said mutual similarity section link information includes information indicative of a link between the section to be included in the first content and the section to be included in the beginning part, being a section ranging from a start point on the time axis of the second content to an end of a certain arbitrary section length, in a plural number, and yet respective mutual similarity sections are continued on the time axis in the second content.

12. A content reproduction order determination system according to claim 1, comprising a playlist preparation means for, based upon said content reproduction order information and said mutual similarity section link information, outputting the reproduction order of the content, and playlist information in which the reproduction section has been specified so that the mutual similarity section is not reproduced in a duplicated manner.

13. A content reproduction order determination method comprising:
 a signal feature series extraction step of, when separate contents are inputted, extracting from each content a signal feature series, being a series of signal features caused to correspond to positions on a time axis of the content;
 a mutual similarity section link generating step of detecting mutual similarity sections, being sections in which the signal features for different contents are similar to each other, from said signal feature series for each content, and generating information for specifying the contents to which each mutual similarity section belongs and, a position of each mutual similarity section on the time axis of each content, and a link indicative of a correspondence relation of said each mutual similarity section, as mutual similarity section link information; and
 a content reproduction order determination step of detecting a mutual similarity section located in a beginning part or an ending part on the time axis of the content from mutual similarity section link information, and determining a correct time-sequential reproduction order of said contents to which each mutual similarity section belongs based upon a relationship of the positions of said detected mutual similarity section and the mutual similarity section corresponding to said detected mutual similarity section on the time axis of each content that said mutual similarity section link information indicates, and outputting information of the determined correct time-sequential reproduction order of said contents as content reproduction order information.

14. A content reproduction order determination method according to claim 13, wherein said content is a media having a time axis, said media configured of video signals or audio signals, or both of the video signals and the audio signals.

15. A content reproduction order determination method according to claim 13, wherein said signal feature series includes at least one of a feature representing the video signals to be included in the content, and a feature representing the audio signals to be included in the content.

16. A content reproduction order determination method according to claim 13, wherein said mutual similarity section link generating step performs a process of predicting the signal features from said signal feature series when detecting the mutual similarity sections.

17. A content reproduction order determination method according to claim 13, wherein said content reproduction order determination step determines that a content pair in which no mutual similarity section exists is not a target of continual reproduction based upon said mutual similarity section link information.

18. A content reproduction order determination method according to claim 13, wherein said content reproduction order determination step determines the reproduction order in such a manner that a second content is reproduced after a first content when said mutual similarity section link information includes information indicative of a link between the section to be included in an ending part, being a section ranging from an end point on the time axis of the first content to a head of a certain arbitrary section length, and the section to be included in a beginning part, being a section ranging from a start point on the time axis of the second content to an end of a certain arbitrary section length.

19. A content reproduction order determination method according to claim 13, wherein said content reproduction order determination step determines the reproduction order in such a manner that the second content is reproduced after the first content when said mutual similarity section link information includes information indicative of a link between the section to be included in the first content and the section to be included in a third content, and a link between the section to be included in the second content and the section to be included in the third content, and yet the mutual similarity section to the first content exists ahead of the mutual similarity section to the second content on the time axis in the third content.

20. A content reproduction order determination method according to claim 13, wherein said content reproduction order determination step determines the reproduction order in such a manner that the second content is reproduced after the first content when said mutual similarity section link information includes information indicative of a link between the section to be included in an ending part, being a section ranging from an end point on the time axis of the first content to a head of a certain arbitrary section length, and the section to be included in the second content in a plural number.

21. A content reproduction order determination method according to claim 13, wherein said content reproduction order determination step determines the reproduction order in such a manner that the second content is reproduced after the first content when said mutual similarity section link information includes information indicative of a link between the section to be included in an ending part, being a section ranging from an end point on the time axis of the first content to a head of a certain arbitrary section length, and the section to be included in the second content in a plural number, and yet respective mutual similarity sections are continued on the time axis in the first content.

22. A content reproduction order determination method according to claim 13, wherein said content reproduction order determination step determines the reproduction order in such a manner that the second content is reproduced after the first content when said mutual similarity section link information includes information indicative of a link between the section to be included in the first content and the section to be included in the beginning part, being a section ranging from a start point on the time axis of the second content to an end of a certain arbitrary section length, in a plural number.

23. A content reproduction order determination method according to claim 13, wherein said content reproduction order determination step determines the reproduction order in such a manner that the second content is reproduced after the first content when said mutual similarity section link information includes information indicative of a link between the section to be included in the first content and the section to be included in the beginning part, being a section ranging from a start point on the time axis of the second content to an end of a certain arbitrary section length, in a plural number, and yet respective mutual similarity sections are continued on the time axis in the second content.

24. A content reproduction order determination method according to claim 13, comprising a playlist preparation step of, based upon said content reproduction order information and said mutual similarity section link information, outputting the reproduction order of the content, and playlist information in which the reproduction section has been specified so that the mutual similarity section is not reproduced in a duplicated manner.

25. A non-transitory computer readable storage medium storing a content reproduction order determination program for causing an information processing apparatus to execute:

a signal feature series extraction process of, when separate content are inputted, extracting from each content a signal feature series, being a series of signal features caused to correspond to positions on a time axis of the content;

a mutual similarity section link generating process of detecting mutual similarity sections, being sections in which the signal features for different contents are similar to each other, from said signal feature series for each content, and generating information for specifying the contents to which each mutual similarity section belongs and, a position of each mutual similarity section on the time axis of each content, and a link indicative of a correspondence relation of said each mutual similarity section, as mutual similarity section link information; and a content reproduction order determination process of detecting a mutual similarity section located in a beginning part or an ending part on the time axis of the content from mutual similarity section link information, and determining a correct time-sequential reproduction order of said contents to which each mutual similarity section belongs based upon a relationship of the positions of said detected mutual similarity section and the mutual similarity section corresponding to said detected mutual similarity section on the time axis of each content that said mutual similarity section link information indicates, and outputting information of the determined correct time-sequential reproduction order of said contents as content reproduction order information.

* * * * *